Patented Dec. 16, 1952

2,622,074

UNITED STATES PATENT OFFICE 2,622,074

SALTS OF α-ACYLAMIDO AND α-ALKOXY-CARBONAMIDO ACRYLIC ACIDS

Harry W. Coover, Jr., and Joseph B. Dickey, Rochester, N. Y., assignors to Eastman Kodak Company, Rochester, N. Y., a corporation of New Jersey No Drawing. Application December 9, 1949, Serial No. 132,216

11 Claims. (Cl. 260—77.5)

This invention relates to salts of α-acylamido and α-alkoxycarbonamido acrylic acids and polymers thereof.

The patent literature is replete with acrylic acids, their salts and polymers. More specifically, numerous α-substituted acrylic acids and salts are well known. However, polymers of the particular α-substituted acrylic acids and certain of the α-substituted acrylic acids themselves have not previously been described. That is, Bergmann and Grafe, Z. Physiol. Chem., 187–195 (1930) describe methods of preparing α-acetamidoacrylic acid but they did not prepare polymers therefrom. In fact, no reference is found in the literature to the polymerization of this compound. This is not surprising since we have discovered that the compound does not undergo polymerization in the normal manner and resists polymerization under a great variety of conditions and catalysts. We have made the surprising and important discovery that α-acetamidoacrylic acid will polymerize with ease in an alkaline medium both with and without a peroxide type of catalyst. A further unexpected development is that the homologues; for example, α-propionamido-acrylic acid, polymerize readily in either the salt or acid form or in the presence of the usual peroxide type of catalyst. We also find that the α-alkoxycarbonamido acrylic acids including, surprisingly, α-methoxycarbonamido acrylic acid, polymerize readily in the presence of alkali with or without the addition of other catalysts.

The α-alkoxycarbonamido acrylic acids and polymers are described and claimed in the Dickey et al. U. S. patent application, Serial No. 132,217 filed concurrently herewith. Polymers of α-propionamidoacrylic acid and higher homologues are described in the Coover et al. U. S. patent application, Serial No. 132,214 filed concurrently herewith.

The polymerizable salts of our invention have the general formulas:

$$CH_2=C-COOZ$$
$$\phantom{CH_2=C-}|$$
$$\phantom{CH_2=C-}NH-COOR$$

α-(alkoxycarbonamido) acrylic acid salt $$CH_2=C-COOZ$$
$$\phantom{CH_2=C-}|$$
$$\phantom{CH_2=C-}NH-CO-R$$

α-(acylamido) acrylic acid salt wherein R is an alkyl or aryl group such as methyl, ethyl, propyl, phenyl, etc., and Z is ammonium, alkyl-substituted ammonium, or an alkali metal such as sodium or potassium. More specifically, the preferred acyl groups in the above formulas are acetyl, propionyl, butyryl and valeryl; however, useful polymers are obtained from salts wherein R is phenyl, substituted-phenyl or $(CH_2)_n-CH_3$ in which $n=1-26$ and $C_nH_{2n-2}$ in which $n=2-26$; for example, $$CH_2-CH=CH=CH_3$$

In the case of the α-acylamido substituted acrylic acids, R can, in addition, be cycloalkyl, e. g. cyclohexyl; furyl, hydroxyalkyl, alkoxyalkyl; $CF_3$, $CHF_2$, $CH_2CHF_2$ etc.; $NH_2$, $COOH$, $CONH_2$,

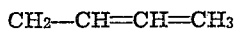

e. g.

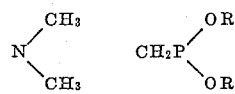

etc.

The α-acylamidoacrylic acids are readily prepared by condensing the appropriate acyl amide with pyruvic acid and then splitting out one of the acyl amido groups as shown by the following reaction:

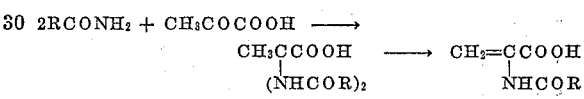

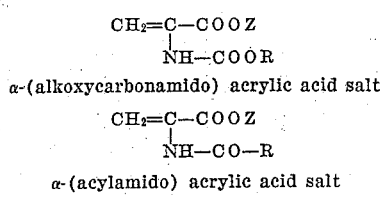

Acylamides are readily condensed with pyruvic acid to give high yields of α,α-diacylamido propionic acids. The condensation is usually carried out by reacting 2 equivalents of an acylamide with 1 equivalent of pyruvic acid. The reaction mixture is heated at 100–110° C. under a vacuum of 10–15 mm. for 3–5 hours. The use of catalytic amounts of strong acids such as concentrated hydrochloric acid greatly speeds up the condensation. The next step in the synthesis involves the splitting out of one of the acylamido groups. This reaction is readily brought about by heating the α,α-diacylamido propionic acid at reflux for 2 to 8 minutes in 1 to 10 volumes of glacial acetic acid. In most cases, upon cooling the reaction mixture to 0° C., the resulting α-acylamido acrylic acid precipitates out in excellent yields.

The α-alkoxycarbonamido acrylic acids are prepared by reacting the corresponding alkyl carbamate with pyruvic acid to form α,α-bis-(alkoxy-carbonamido)-propionic acids as described by Kraft and Herbst, J. Org. Chem. 10, 496 (1945), and then splitting out one acylcarbonamido group according to the reaction

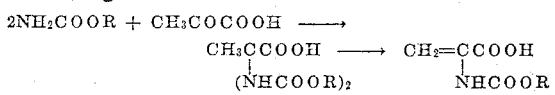

as described more fully hereinafter and in the mentioned co-pending Dickey et al. invention.

This invention includes polymers and copolymers of alkali metal, ammonium and alkyl substituted ammonium salts of the acrylic acids and in the latter case two or more different α-acylamido acrylic acid salts or α-alkoxycarbonamido acrylic acid salts may be polymerized together or in admixture with different compounds containing a polymerizable $CH_2=C<$ or $-CH=C=$ group such as vinyl halides, the acrylates, α-methacrylates, fumarates, maleates, vinyl esters, alkyl alkenyl ketones, α-acyloxyalkenyl nitriles, alkenyl nitriles, and hydrocarbons containing conjugated olefinic unsaturation. More specifically, the monomers set forth in the Magoffin et al. U. S. patent application, Serial No. 773,736, filed September 12, 1947, may be employed, and especially valuable copolymers are obtained with the acylonitriles, vinyl esters, styrenes, and vinyl halides.

For example, when acrylonitrile is polymerized with one of the compounds of the invention, especially a minor proportion thereof, the resultant copolymer can be spun into fibers which have excellent dyeing properties.

Many of the polymers of this invention are soluble in water as their free acids or as their base salts. Solutions of this type may be spun into a suitable medium and formed into fibers. Fibers thus prepared are useful in medicine for bandages, packs, and so forth. If desired, the fibers can be made water-insoluble by treatment with formaldehyde and polyfunctional bases such as those from calcium, magnesium, zinc, titanium, and zirconium salts.

The following examples are illustrative of methods of making the monomers, the salts and polymers of the invention:

EXAMPLE 1

*α,α-diacetamido propionic acid*

118 grams of acetamide and 88 g. of pyruvic acid were heated in a reaction flask equipped for distillation. The reaction mixture was heated in an oil bath at 100° C. until the reaction mixture was liquid. Several drops of concentrated hydrochloric acid were added and the whole heated at 110° C. under a vacuum of 15-20 mm. Heating under these conditions was continued for 4 hours. During this reaction period, the reaction mixture became solid, and the theoretical amount of water was collected in the receiver. The resulting solid product represented almost a quantitative yield of α,α-diacetamido propionic acid. The pure product, M. P. 189-190° C., can be obtained by recrystallization from alcohol.

EXAMPLE 2

*α-acetamidoacrylic acid*

100 g. of α,α-diacetamido propionic acid were added to 500 g. of glacial acetic acid. The mixture was heated rapidly to reflux and kept at this temperature for eight minutes. The reaction mixture was then rapidly cooled to 0° C. and the precipitated product filtered. Recrystallization from ethyl alcohol gave an 85% yield of pure α-acetamidoacrylic acid, M. P. 198-200° C.

EXAMPLE 3

*Sodium α-acetamido acrylate*

12$\frac{9}{10}$ g. of α-acetamidoacrylic acid were dissolved in 50 ml. of alcohol containing 4.4 g. of sodium hydroxide. Addition of ethyl ether to the reaction mixture precipitates the pure sodium α-acetamido acrylate.

The sodium salt can also be prepared by dissolving α-acetamidoacrylic acid in water and neutralizing the acid by addition of sodium hydroxide. Concentration of the water solution followed by recrystallization from methanol gives a high yield of pure sodium α-acetamido acrylate.

The ammonium α-acetamido acrylate can be prepared by dissolving α-acetamidoacrylic acid in alcohol containing ammonia. The pure salt can be isolated by precipitation with ether or by concentration and cooling of the alcohol solution. Other substituted ammonium salts of the acids of the invention, e. g. triethyl-, tripropyl- or tributyl-ammonium salts, are prepared in a similar manner from the corresponding amine.

Other salts of α-acetamidoacrylic acid and its homologues, and of the α-alkoxycarbonamido acrylic acids, can be prepared by similar procedures, and we consider within the scope of the invention the partially neutralized acrylic acids and polymers thereof.

EXAMPLE 4

*α,α-dipropionamido propionic acid*

146 g. of propionamide and 88 g. of pyruvic acid were put into a reaction flask equipped for distillation. The reaction mixture was heated in an oil bath at 100° C. until the propionamide was dissolved. Several drops of concentrated hydrochloric acid were added and heating was continued under a 15-20 mm. vacuum for 4 hours. The solid product was removed from the reaction flask and washed with benzene. A 76% yield of α,α-dipropionamido propionic acid, M. P. 163-165° C., was obtained.

EXAMPLE 5

*α-propionamido acrylic acid*

10 g. of α,α-dipropionamido propionic acid were added to 20 g. of glacial acetic acid and heated at reflux for 5 minutes. The reaction mixture was cooled to 0° C. and a 60% yield of α-propionamido acrylic acid, M. P. 156° C., was obtained.

By the same general procedure, the other types of α-acylamidoacrylic acids are readily prepared.

EXAMPLE 6

10 g. of sodium α-acetamido acrylate are dissolved in 100 cc. of distilled water and polymerized by warming at 50° C. A viscous aqueous solution of the polymer is obtained in a few hours. The free acid is obtained by adding the calculated amount of sulfuric acid. The polymer is precipitated by adding acetone and on drying is a fine white solid. The polymerization will go slowly at room temperature. The addition of a small amount of ammonium persulfate will cause the polymer to form rapidly at room temperature.

EXAMPLE 7

10 g. of ammonium α-acetamido acrylate and 5 g. of α-propionamido acrylic acid are polymerized in 125 cc. water with 0.1 g. ammonium persulfate at 25° C. The polymerization is complete in a few hours. The calculated amount of dilute hydrochloric acid is added and the polymer precipitated with acetone. The polymer is a white solid.

EXAMPLE 8

10 g. triethanolamine α-acetamido acrylate and 20 g. sodium α-benzoylamido acrylate are polymerized in 200 cc. water and worked up as above. The polymer is a white solid.

EXAMPLE 9

10 g. sodium α-acetamido acrylate, 10 g. α-butrylamido acrylate and 0.1 g. α-acrylamido acrylate are polymerized as in Example 7. A heavy, viscous cross-linked gel is obtained.

EXAMPLE 10

10 g. 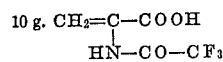

and 10 g. 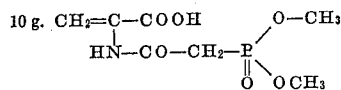

were polymerized as their sodium salts in water. The free acid polymer is very resistant to fire.

EXAMPLE 11

α-(*ethoxycarbonamido*)-*acrylic acid sodium salt*

To a solution of 15.9 g. of α-(ethoxycarbonamido)-acrylic acid in ethanol was added a solution of 4 grams of sodium hydroxide in ethanol. The product precipitated as white crystals and was recrystallized from ethanol.

The ammonium-α-ethoxycarbonamido-acrylate can be prepared by dissolving the acid in alcohol containing ammonia. The pure salt can be isolated by precipitation with ether or by concentration and cooling of the alcohol solution.

Other salts of α-alkoxycarbonamido-acrylic acids can be prepared by similar procedures.

EXAMPLE 12

10 g. of sodium-α-ethoxycarbonamido acrylate was dissolved in 100 ml. of distilled water containing 0.1 g. of potassium persulfate. The polymerization was completed by heating at 50° C. for 8 hours. The polymer can be precipitated from the resultant viscous solution by the addition of acetone.

The other salts can be polymerized in a similar manner.

EXAMPLE 13

10 g. of sodium-α-propionamido acrylate were dissolved in 100 cc. of distilled water and polymerized by heating at 50° C. A viscous aqueous solution of the polymer is obtained in a few hours. The polymer can be precipitated by the addition of acetone.

By the same general procedure, the other salts of α-acrylamido acrylic acids are readily polymerized.

EXAMPLE 14

2 g. of ammonium-α-propionamido acrylate and 8 g. of acrylonitrile were added to 100 ml. of distilled water containing 0.5 g. of hydrogen peroxide and 0.3 g. of ferrous sulfate. The polymerization was completed by heating at 50° C. for 8 hours. The precipitated polymer was filtered, washed with water, and dried. The polymer is soluble in dimethyl acetamide to give a gel-like solution.

EXAMPLE 15

8 g. of sodium-α-acetamido acrylate and 2 g. of vinyl aceate were dissolved in 100 ml. of water containing 0.2 g. of potassium persulfate and 0.2 g. of sodium bisulfite. The polymerization was complete after heating at 40° C. for 6 hours. The polymer can be precipitated from the resultant viscous solution by the addition of acetone.

EXAMPLE 16

2 g. ammonium-α-ethoxycarbonamido acrylate and 8 g. of acrylamide were dissolved in 100 ml. of distilled water containing 0.3 g. of hydrogen peroxide. The polymerization was complete after heating at 60° C. for 24 hours. The polymer can be precipitated as a white solid by the addition of acetone to the viscous solution.

EXAMPLE 17

5 g. of sodium-α-methoxycarbonamido-acrylate, 1 g. of acrylonitrile and 4 g. of vinyl acetate were added to 100 ml. of water containing 0.2 g. of ammonium persulfate and 0.2 g. of sodium bisulfite. The polymerization was complete after heating at 50° C. for 6 hours. The polymer can be precipitated as a white hard polymer by the addition of acetone to the milky viscous solution.

The above examples provide copolymers from mixtures of various proportions of the salts of the invention with other monomers. In general, we can obtain valuable copolymers from mixtures of monomers containing from 5-95% by weight of the salts of the invention, however, the preferred range depends upon the use to which the product is to be put and the range of from 5-50% is most preferred for our purposes.

We claim:

1. A polymer of a salt of an α-substituted acrylic acid of the group consisting of salts having the general formulas:

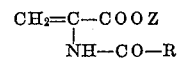

and

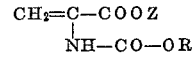

wherein R is of the group consisting of alkyl groups of from 1 to 4 carbon atoms, and aryl groups of the benzene series, and Z is of the group consisting of alkali metals, ammonium, and alkyl-substituted ammonium.

2. A polymer of an alkali metal salt of α-(acetamido) acrylic acid.

3. A polymer of an alkali metal salt of α-(propionamido) acrylic acid.

4. A polymer of an ammonium salt of α-(acetamido) acrylic acid.

5. A polymer of an ammonium salt of α-(propionamido) acrylic acid.

6. A polymer of an ammonium salt of α-(ethoxycarbonamido) acrylic acid.

7. A copolymer obtained by polymerization of a mixture comprising from 5 to 95% by weight of an alkali metal salt of α-(acetamido) acrylic acid, and from 95 to 5% by weight of a compound containing a polymerizable $CH_2=C<$ group.

8. A copolymer obtained by polymerization of a mixture comprising from 5 to 95% by weight of an alkali metal salt of α-(propionamido) acrylic acid, and from 95 to 5% by weight of a compound containing a polymerizable $CH_2=C<$ group.

9. A copolymer obtained by polymerization of a mixture comprising from 5 to 95% by weight of an ammonium salt of α-(acetamido) acrylic acid, and from 95 to 5% by weight of a compound containing a polymerizable $CH_2=C<$ group.

10. A copolymer obtained by polymerization of a mixture comprising from 5 to 95% by weight of an ammonium salt of α-(propionamido) acrylic acid and from 95 to 5% by weight of a compound containing a polymerizable $CH_2=C<$ group.

11. A copolymer obtained by polymerization of a mixture comprising from 5 to 95% by weight of an ammonium salt of α-(ethoxycarbonamido) acrylic acid, and from 95 to 5% by weight of a compound containing a polymerizable $CH_2=C<$ group.

HARRY W. COOVER, Jr.
JOSEPH B. DICKEY.

REFERENCES CITED

The following references are of record in the file of this patent:

Z physiol. Chem. 187, 187–195 (1930) cf. C. A. 24, 2150–2151.

"Kurzes Handbuch der Polymerisationstechnik" by Franz Krczil, vol. 1.